US011217201B2

(12) United States Patent
Grossman et al.

(10) Patent No.: US 11,217,201 B2
(45) Date of Patent: *Jan. 4, 2022

(54) VIDEO FRAME INTERFACES FOR LOGICALLY-DEFINED PIXELS

(71) Applicant: Microsoft Technology Licensing, LLC, Redmond, WA (US)

(72) Inventors: Mark Stefan Grossman, Palo Alto, CA (US); Nicholas Robert Baker, Cupertino, CA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/914,986

(22) Filed: Jun. 29, 2020

(65) Prior Publication Data

US 2020/0327863 A1    Oct. 15, 2020

Related U.S. Application Data

(63) Continuation of application No. 15/871,888, filed on Jan. 15, 2018, now Pat. No. 10,720,124.

(51) Int. Cl.
*G09G 5/00* (2006.01)
*G06F 3/14* (2006.01)
*H04N 7/01* (2006.01)

(52) U.S. Cl.
CPC ............... *G09G 5/005* (2013.01); *G06F 3/14* (2013.01); *H04N 7/0117* (2013.01);
(Continued)

(58) Field of Classification Search
CPC ............... G09G 5/005; G09G 2340/02; G09G 2340/04; G09G 2340/0407;
(Continued)

(56) References Cited

U.S. PATENT DOCUMENTS

| 5,576,765 A * | 11/1996 | Cheney | H04N 19/00 375/240.02 |
| 7,483,585 B2 * | 1/2009 | Brakus, Jr. | H04N 1/419 382/232 |

(Continued)

OTHER PUBLICATIONS

Neal Kendall, Essentials of DisplayPort Display Stream Compression (DSC) Protocols, Feb. 2018, Teledyne LeCroy, pp. 74 (Year: 2018).*

(Continued)

*Primary Examiner* — Phuc N Doan

(57) ABSTRACT

Logically-defined pixel interfaces and video frame transfer techniques are provided herein. In one example, a method includes receiving a video frame representing source pixels, where the video frame comprises logical pixels that each represent more than one source pixel according to a selected sizing and metadata that indicates the selected sizing for the logical pixels and indicators of which pixels included in the video frame comprise the logical pixels. The method also includes interpreting the metadata for the logical pixels to map each of the logical pixels across more than one output pixel according to the selected sizing and the indicators included in the metadata.

20 Claims, 5 Drawing Sheets

(52) U.S. Cl.
CPC . *G09G 2340/04* (2013.01); *G09G 2340/0457* (2013.01); *G09G 2350/00* (2013.01); *G09G 2370/04* (2013.01)

(58) Field of Classification Search
CPC ....... G09G 2340/0457; G09G 2370/04; H04N 7/0117; H04N 7/122; H04N 19/00; H04N 19/10; H04N 19/48
See application file for complete search history.

(56) References Cited

U.S. PATENT DOCUMENTS

| | | | | |
|---|---|---|---|---|
| 8,655,086 | B1 * | 2/2014 | Christensen | G06T 9/00 382/233 |
| 9,769,417 | B1 * | 9/2017 | Yarygin | H04N 21/434 |
| 10,049,427 | B1 * | 8/2018 | Lachowsky | G06T 1/60 |
| 2012/0237101 | A1 * | 9/2012 | Kaempfer | G06T 9/005 382/131 |
| 2016/0065976 | A1 * | 3/2016 | He | H04N 19/176 375/240.12 |
| 2016/0088281 | A1 * | 3/2016 | Newton | H04N 19/186 348/43 |
| 2016/0241829 | A1 * | 8/2016 | Qu | H04N 21/4318 |
| 2017/0251161 | A1 * | 8/2017 | Toma | H04N 5/775 |
| 2017/0337691 | A1 * | 11/2017 | Lim | G06T 7/11 |
| 2018/0027278 | A1 * | 1/2018 | Yang | H04N 21/435 725/131 |

OTHER PUBLICATIONS

Wikipedia, DisplayPort, Dec. 2017, pp. 24 (Year: 2017).*
Frederick Walls, et al.; "VESA Display Stream Compression"; Mar. 3, 2014; pp. 1-5; VESA.

* cited by examiner

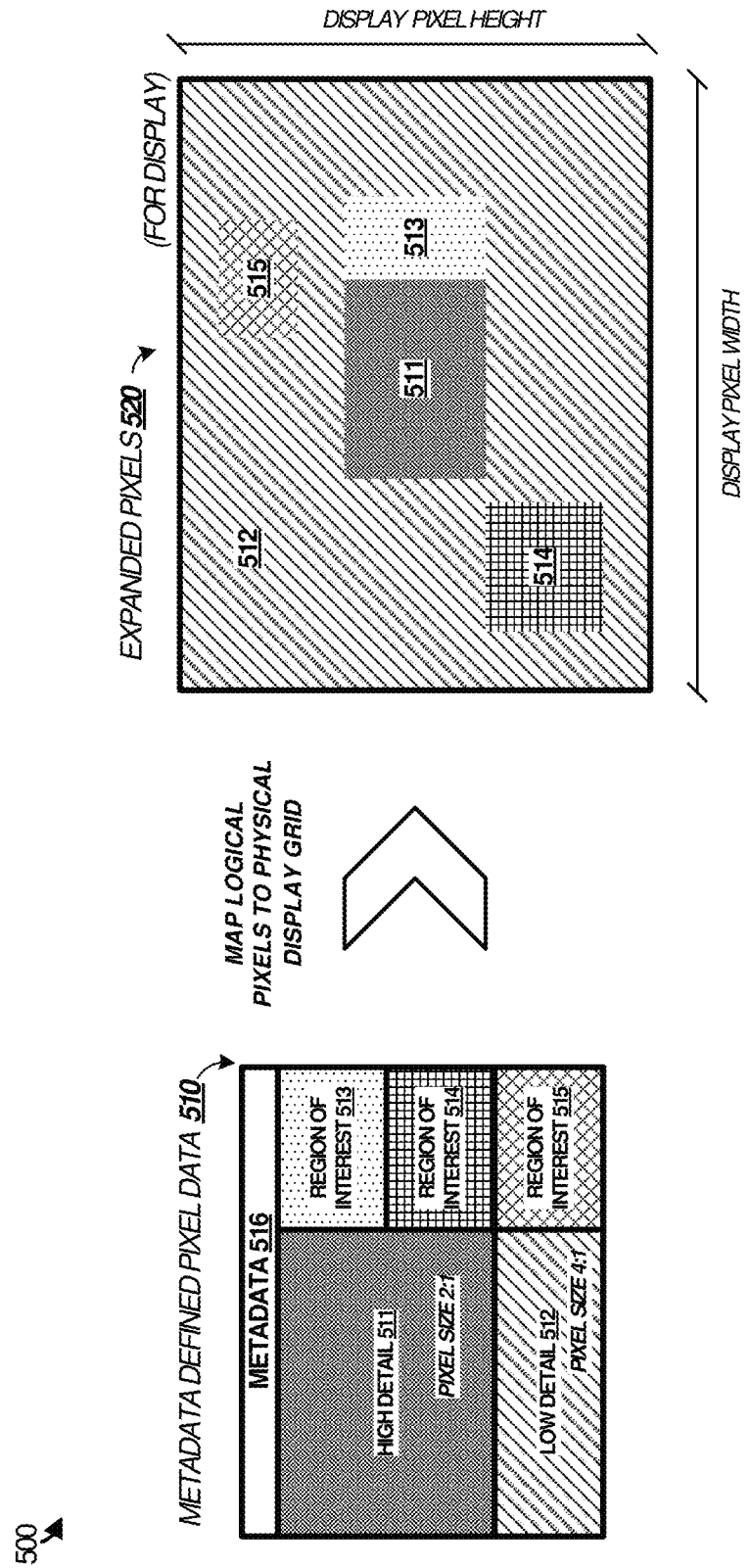

VIDEO FRAME INTERFACES FOR LOGICALLY-DEFINED PIXELS

CROSS REFERENCE TO RELATED PATENT APPLICATIONS

This patent application is a continuation of and claims priority to U.S. patent application Ser. No. 15/871,888, filed on Jan. 15, 2018, entitled "VARIABLE PIXEL RATE DISPLAY INTERFACES;" and hereby incorporated by reference into this patent application.

BACKGROUND

Various electronic user systems, such as computers, gaming systems, and media players, can establish graphics/video outputs for displays and other video systems. For example, a computing system can provide various graphical user interface elements to a video monitor that displays the graphical user interface elements to a user. Gaming and computing systems can interface with monitors, televisions, or virtual reality displays, among others. These user systems include video processor elements, such as graphics cards, graphics processing cores, as well as various display interface circuitry and connectors. However, as popularity with high-performance gaming and video-intensive virtual or augmented reality systems has increased, so has bandwidth requirements increased for transfer of video data from host systems to associated displays. These bandwidth increases can be limited by video link bandwidths, display interfaces, and other elements that generate and transport high-bandwidth video data.

Overview

Logically-defined pixel interfaces and video frame transfer techniques are provided herein. In one example, a method includes receiving a video frame representing source pixels, where the video frame comprises logical pixels that each represent more than one source pixel according to a selected sizing and metadata that indicates the selected sizing for the logical pixels and indicators of which pixels included in the video frame comprise the logical pixels. The method also includes interpreting the metadata for the logical pixels to map each of the logical pixels across more than one output pixel according to the selected sizing and the indicators included in the metadata.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 5 illustrates example metadata-defined variable pixel data in an implementation.

DETAILED DESCRIPTION

Figure 1:
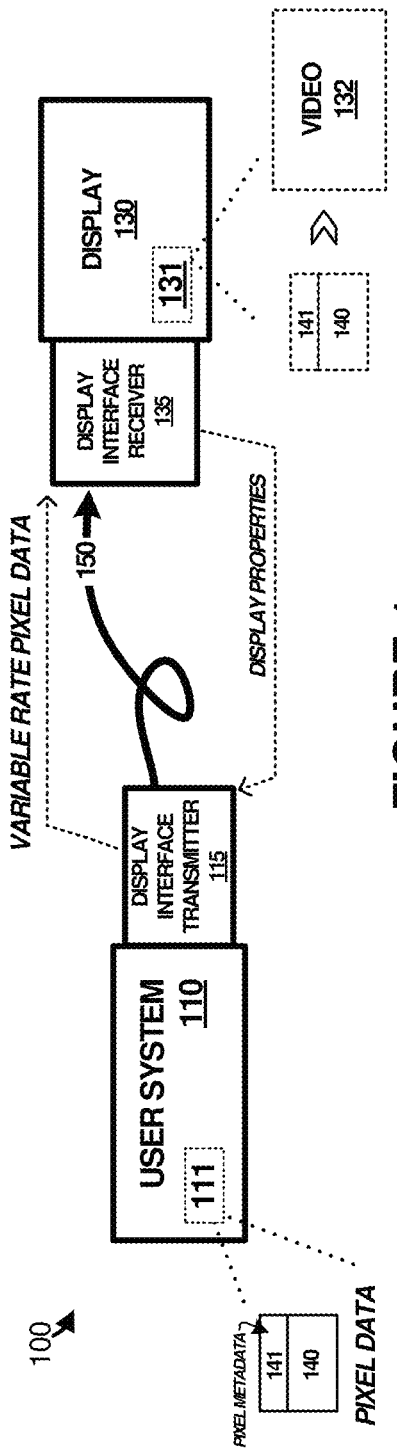
FIG. 1 illustrates a video display environment in an implementation.

End user systems, such as computing devices, set-top boxes, gaming systems, entertainment devices, and the like, can include display output capabilities to allow a user to interface with graphical elements, graphical user interfaces, and view media content. The display outputs can be coupled to associated display devices, such as a video monitor, television, head-mounted display, or even provided over network links or virtualized links. Most displays have fixed native resolutions for displaying graphical images or video data, which might be defined by the display technology employed or the sizing of the display elements, among other factors. The size and spatio-temporal pixel density of displays is increasing to the point where it can become prohibitively expensive in terms of input/output (I/O) connections, power, and ultimately monetary cost, to drive all of the pixels all the time for rendered video data.

Although variable frame rate techniques and full-screen upscaling within displays have been developed, fundamentally every pixel on every display line or "scanline" is still sent over a video interface/link to displays, such as liquid-crystal display (LCD) or light-emitting diode (LED) based displays. Display stream compression (DSC) techniques provide lossy bandwidth reduction over display links unrelated to how video content was generated, and is limited to compression ratios of about 3:1. Foveated displays, foveated rendering, and depth-of-field based rendering techniques can be effective at reducing an amount of rendering work in graphics processing units (GPUs), but again this savings is not carried through the rest of the display chain, and bandwidth savings are not achieved natively in display links or in displays. Another technique employs GPUs that allow multiple frame buffer regions to be rendered at different pixel densities. However, these still expand the video data out to full resolution via pixel replication before transmission. Multiple resolution regions (e.g. foveated and non-foveated) can also be rendered separately then transmitted as sub-frames and combined at the receiver/display. However, these sub-frames still have bandwidth limitations over associated display links and the entire display chain.

The enhancements discussed herein propose changes to not only video data prepared for transfer over display links, but also across the entire display chain—from frame buffering in the source, transmission over display links, and handling for display by display driver circuitry. Enhancements can be included in the display system, display interface circuitry, display links/interfaces, and display processing (i.e. in the TV or monitor) to represent variations in resolution at the pixel level. The above partial techniques discussed above can work alongside the enhanced techniques discussed herein to reduce bandwidth requirements for transfer and display of video content. The variable pixel rates discussed herein can provide 10:1 savings in bandwidth, with no quality loss unless selected display regions are desired to have a lower fidelity. Thus, enhancements discussed herein provide ways to drive traditional fixed-grid panels more efficiently, taking into account factors such as the distance and focal point of the user. Also, some emerging microelectromechanical systems (MEMS) based displays have no fixed pixel grid, and the techniques discussed herein are compatible for use in such displays.

To provide the enhancements, variations in pixel rates, such as pixel density or pixel size, can be specified using at least metadata that indicates sizes of a plurality of uniquely colored regions among source pixels that are then represented by logically-defined pixels. For instance, in a GPU-generated frame buffer containing source pixels of a video frame, uniquely colored regions comprised of many source pixels can be represented by one or more logical pixels defined by metadata. These logical pixels can be specified to represent a quantity of pixels of a traditional fixed-resolution rectangular frame buffer, such as 1×1, 1×2, 2×1, 2×2, or optionally larger. A variable height (horizontal size) and width (vertical size) can be specified for each logical pixel, which can include integer sizes or fractional sizes as compared to the source pixels or source scanlines. Horizontal sizes can span more than one source pixel in a scanline, while vertical sizes can span source pixels on more than one scanline.

As the frame buffer is read ("scanned out") by an associated display controller, the metadata can optionally result in a frame buffer that is stored more compactly, such that fewer bytes are fetched, or it can optionally result in the display controller fetching a subset of the pixel values stored traditionally with constant density. The display controller can be designed to handle the variable reads forming the logical pixels when it performs any optional color conversion, resizing, filtering, etc., and ultimately preserves the variability in pixel sizing in order to reduce the number of unique colors sent to a display output for transfer to a display. On the receiving end of a display interface, logic reconstructs each full scanline as appropriate to the display technology—either to full pixel density for TFT/LED/gridded panels, or into a data stream more appropriate for MEMS displays.

Bandwidth of a display link that carries variable pixel rate data can carry a full scanline, or this bandwidth can be spread over the scanline or several scanlines to be more effective. For example, if a foveated display region occupied 25% of a scanline then the display link and associated interfaces need not carry the maximum data rate of a scanline. Instead this bandwidth can be amortized across the full scanline, resulting in a reduction in the interface data rate of 35 percent or more. Advantageously, this bandwidth amortization can lead to fewer display interface data lanes or a lower display interface operating frequency.

The metadata discussed herein can be transferred along with the variable rate pixel data, or the metadata can be regenerated without the need to be explicitly transferred. The metadata describes the positions of each transmitted color along each scanline. The metadata could also in some examples indicate whether neighboring colors should be interpolated for use with fixed-density displays. The metadata may be converted into a different form suitable for MEMS displays that have no fixed pixel positions.

The variable pixel rate discussed herein can be applied in addition to other video transfer techniques, such as Display Stream Compression (DSC) techniques. Since variable pixel rate video data input to a DSC compressor will typically have reduced frequency content, then advantageously, the lossiness of a DSC technique should be reduced. DSC techniques might have to be modified to preserve and account for the variable pixel rate metadata. DSC techniques can also be modified to compound a compression effect by understanding that an associated tile size is smaller. For example, DSC can work with slices that are a small number of scanlines DSC algorithms can determine that an input resolution is reduced when using variable pixel rate, and the DSC algorithms can vary associated processing to process more image area at the same (fixed) per-pixel rate.

The variable pixel rates can also be applied to coded video streams as well, which can advantageously avoid decoding every block to identical density. For example, by preserving the maximum spatial frequency for each block, variable pixel rates can be applied. The variable pixel rates can also be applied to display hardware that supports partial updates via temporal storage, and such interface designs should permit both types of rendering and bandwidth savings.

As a first example, FIG. 1 is provided. FIG. 1 illustrates a variable pixel rate environment 100 in an implementation. Environment 100 includes user system 110 which can be coupled to various video displays 130. User system 110 can communicatively couple to video display device over display link 150. User system 110 includes variable pixel rate service 111 and display interface transmitter 115. In some examples, user system 110 can include optional user interface devices, such as gaming controllers, augmented/virtual reality controllers, and the like. Display 130 includes display driver circuitry 131 and display interface receiver 135.

In operation, source pixel data is generated by user system 110 for display to a user by display 130, such as rendered video resultant from user interaction with applications, games, or media. This source pixel data can comprise videos, images, or other digital representations. However, variable pixel rate service 111 can advantageously generate and transfer variable pixel rate data over display interface transmitter 115, display link 150, and display interface receiver 135. Groups of pixels of the source pixel data can be represented as one or more "logical" pixels defined in part by associated metadata. This metadata can accompany the logical pixels and be sent over display interface transmitter 115, display link 150, and display interface receiver 135, or might be regenerated by display 130. The bandwidth requirements of display interface transmitter 115, display link 150, and display interface receiver 135 can thus be reduced in accordance with the amount of pixel rate reduction provided by transferring the logical pixels and associated metadata instead of the source pixel data.

Figure 2:
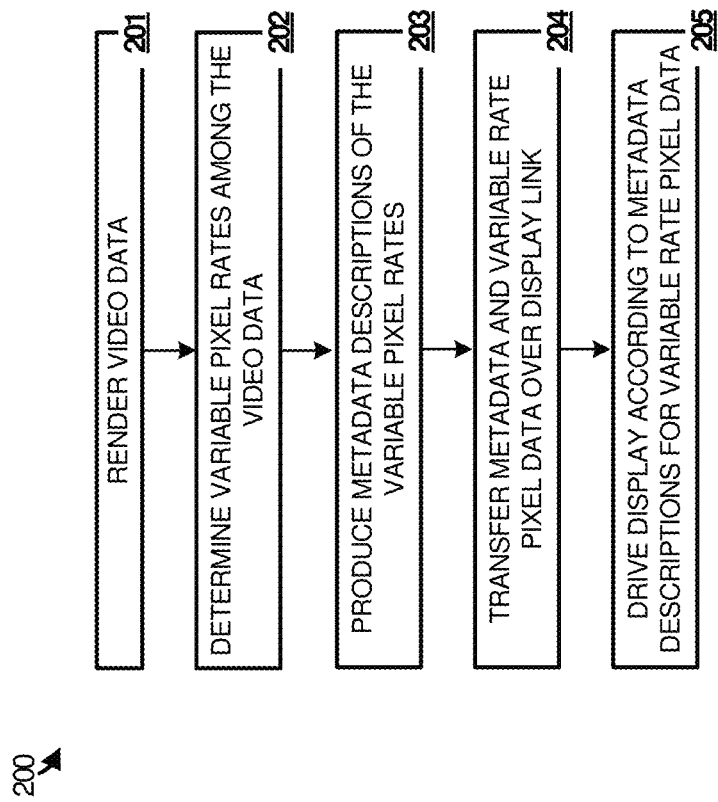
FIG. 2 illustrates operation of a video display environment in an implementation.

To further illustrate the operations of elements of environment 100, FIG. 2 is provided. In FIG. 2, user system 110 renders (201) video data for output to a display. This rendering can be performed in graphics processing elements of user system 110, such as a GPU or other graphics processor. The video data can be formed from an array of pixels that represents individual images or portions of images for video content, and resultant from user application usage, media playback, gaming system interaction, augmented/virtual reality content, or other video data. The video data can be made of individual frames of video which are rendered for display. Typically, the video data is rendered to have a target resolution, such as a horizontal by vertical quantity of pixels. In the discussion below, the video data rendered for output is referred to as the source video, with a plurality of source pixels comprising the source video.

User system 110 determines (202) variable pixel rates among the source video data. These variable pixel rates can be determined by elements of user system 110, such as variable pixel rate service 111. Variable pixel rate service 111 might include portions of rendering hardware/software of user system 110, as well as post-rendering elements, such as processing elements associated with the frame buffer. Uniquely colored regions among source pixels are determined by service 111, and these uniquely colored regions are used to define representative pixels of varying size. Logically-defined pixels can be established that each represent their dimensions with respect to a quantity of fixed-size traditional source pixels, such as 1×1, 1×2, 2×1, 2×2, fractional dimensions, or larger logically-defined pixels. Metadata descriptions can also be produced (203) that indicate properties of the logical pixels. For example, the metadata can indicate a variable height in source pixels and width in source pixels represented by each logical pixel.

User system 110 transfers (204) metadata 141 and variable rate pixel data 140 over display interface transmitter 115 and display link 150. This metadata 141 can accompany pixel data 140 on the display interface circuitry/link portions of the transfer. In some examples, display link 150 is configured to support transfer of metadata information along with the pixel data. Data lanes or data signals normally configured to carry video data, such as differential signaling lines that carry image/video data, can be configured to carry metadata describing the pixel data. Thus, bandwidth of physical layer signaling for a video/display link normally configured to carry video data can also carry metadata for the aforementioned logically-defined pixels.

The metadata can be embedded or adjoined to pixel data during transfer using the display link signaling, and an image or individual frame of data might be subdivided into sub-portions that are transferred over a display link for later interpretation and display by a display device. In one example, a frame of video formed from logically-defined pixels can include a header, footer, or portion thereof comprised of metadata. In another example, the metadata can be interleaved with each logical pixel or with each scanline comprised of logical pixels. Other configurations are possible for transferring the metadata, such as spatial segregated or time segregated transfer with pixel data.

Display 130 receives pixel data 140 and metadata 141 over link 150 and display interface receiver 135. Display driver circuitry 131 drives (205) a screen or other display elements of display 130 according to metadata descriptions for associated variable rate pixel data. Display driver circuitry 131 comprises logic to reconstruct each full scanline as appropriate to the display technology using the metadata descriptions and variable rate pixel data. For example, metadata 141 might indicate that individual ones of the logical pixels among variable rate pixel data 140 represent one or more source pixels. This can be indicated by height/width parameters for the logical pixels, among other notations. The metadata can indicate that logical pixel sizes can vary from one logical pixel to the next, and some logical pixels might span more than one line or scanline of a frame/image.

Each logical pixel can thus be expanded based on corresponding metadata into one or more output pixels for display on a screen as video 132 or other display element of display 130. The logical pixels might be expanded line-by-line, such as when logical pixels do not span scanlines. However, when the logical pixels span scanlines, such as when having vertical heights of more than one source pixel, then circuitry 131 can buffer an appropriate quantity of scanlines before expanding the logical pixels to the output pixels and driving an associated display screen. Since latency delays are incurred with each additional scanline that is buffered, service 111 might desire to balance bandwidth savings using the logical pixels against latency in expanding logical pixels in a display.

Moreover, as discussed below in more detail, various regions can be specified using the metadata to define groupings of similar sizes of logical pixels. These regions can be used to establish resolution partitioning among output pixels. Foveated regions or foveated image data can be established by service 111 using the logical pixels and corresponding metadata to produce frames or images with different zones of higher or lower resolution. This can be useful when producing video for eye-centric displays, such as virtual/augmented reality displays that have higher resolution where user eyes might focus and less resolution in peripheral vision zones.

End-to-end bandwidth savings for foveated displays can be incurred using the variable rate pixel data discussed herein. Specifically, certain regions of video displays dedicated to low resolution data might have larger physically-defined pixels, while other regions dedicated to high resolution data might have smaller physically-defined pixels. Since display interface transmitter 115, display link 150, display interface receiver 135 all support variable rate pixel data and associated metadata, associated video frames can be transferred using less bandwidth than normally encountered in foveated displays. Typical foveated displays still require display interface circuitry/link elements to support the highest resolution regions transferred to a display. However, in the examples herein, even foveated displays can employ the variable rate pixel data and use display interface circuitry/links of a lower bandwidth. Buffering of more than one scanline/display line in the display can further reduce link bandwidth usage by allowing for logical pixels that span more than one physical scanline.

In further examples, service 111 can determine logical pixel sizing, metadata, resolution partitioning, or foveated regions by communicating with display 130 to obtain corresponding display properties. Service 111 can use this information to drive a display according to an expected expanded pixel outputs in accordance with a display technology corresponding to the associated display. For example, MEMS displays might have variable pixel density across each scanline, whereas OLED displays might have fixed grids with constant pixel density. Service 111 can compensate for this variable pixel density when producing logical pixels from source pixel data using at least display properties comprising target resolutions or target display types/technologies obtained from the display.

To obtain these display properties, service 111 can communicate with display 130 over link 150. User system 110 can detect when any video display 130 is coupled over link 150, which might include a physical coupling or connecting of a cable or an initiation of a wireless or optical connection to a display output of user device 110. Responsive to this connection or coupling, service 111 determines properties from display 130. These properties can be requested, read, or otherwise provided by display 130 to user system 110, such as over link 150. These properties can include display model information, display type information, display descriptors, display identifiers, supported display resolutions, status information, display settings, color gamut information, display foveation properties, or other information, including combinations thereof. In some examples, such as when link 150 carries High-Definition Multimedia Interface (HDMI) or DisplayPort links, the properties can include Extended Display Identification Data (EDID). EDID includes data structures provided by a coupled digital display to describe associated capabilities to a display source, such as user system 110. EDID can indicate various properties of the display device, such as display make and model, display manufacturer name, display product codes, display year-of-manufacture, serial numbers, or other display identifiers or display identities.

Returning to a discussion of the elements of FIG. 1, user system 110 comprises an end user system, such as gaming systems, augmented/virtual reality systems, terminals, computing devices, tablet devices, smartphones, personal computers, servers, cloud-based systems, distributed computing platforms, and the like. Users, such as users of a gaming system, entertainment platform, computing system can interact with user interface elements of user system 110 via user interface devices. User system 110 can include processing systems, memory systems, network interface equipment, user interface elements, audio and graphics processing systems, video handling systems, as well as variable pixel rate services, such as service 111.

Variable pixel rate service 111 determines and applies a variable pixel sizing process to graphics or video generated by user system 110. Variable pixel rate service 111 comprises one or more execution elements which provide variable pixel sizing features for graphics or video generated by user system 110 in a graphics or video processing portion of user system 110. Variable pixel rate service 111 can include hardware and software elements, such as video processors, graphics cores, video cards, graphics interface cards, video memory, scaling hardware and software elements, graphics engines, scaling engines, execution units, rendering units, memory interface units, or other elements, including combinations and variations thereof.

Optional user interface devices receive user input from various input devices, such as one or more gaming controllers, keyboards, mouse devices, touch screens, touch panels, or other user input devices which can be used in combination with voice input, visual input, or other user input methods. This user input can be detected by user system 110 and translated into actions which can be interpreted by further elements of user system 110, such as variable pixel rate service 111.

Video display 130 can comprise one or more video monitors, televisions, projectors, touchscreens, transported video interfaces, virtualized interfaces, or other video or graphics viewing elements, including combinations thereof. Each display device can have one or more input interfaces for receiving graphics or video from a source, such as from user system 110 over link 150. Video display 130 can include various display technologies. For example, video display 130 can comprise gridded panels or MEMS displays, among others. Gridded panels typically comprise displays such as liquid crystal (LCD), light-emitting diode (OLED), or organic light-emitting diode (OLED). MEMS displays typically comprise Digital Light Projection (DLP) displays, laser-scanned displays, among others.

Display driver circuitry 131 can comprise one or more processors, microprocessors, programmable logic arrays, discrete circuitry, and other related circuitry and firmware elements. Display driver circuitry 131 comprises circuitry and logic to interpret logical pixels and associated metadata that is received over a display interface and construct output pixels based on the logical pixel data received. Display driver circuitry 131 can process the metadata against each logical pixel to expand each logical pixel into one or more output pixels. Display driver circuitry 131 can include buffer or memory circuitry to store input pixel data for one or more scanlines. Display driver circuitry 131 includes logic to process data buffered for more than one scanline and output pixels resultant from logical pixels with vertical heights that span scanlines. Display driver circuitry 131 also includes circuitry and logic to output pixels of different configurations for various segregated regions among an associated display, such as for foveated displays. Display driver circuitry 131 logic can extract metadata transferred with pixel data, such as when the metadata is interspersed, adjoining, or time-separated from pixel data.

Display interface transmitter 115 and display interface receiver 135 each comprise interfacing circuitry configured to handle variable pixel rate information and associated metadata. Display interface transmitter 115 and display interface receiver 135 each can each include transceivers, drivers, re-drivers, buffers, voltage level conversion circuitry, and other associated circuitry. Display interface transmitter 115 and display interface receiver 135 each can each handle video source signals comprising analog or digital signaling, or specialized high-speed differential signaling formats, such as carried using Transition-Minimized Differential Signaling (TMDS) or low-voltage differential signaling (LVDS) techniques. Display interface transmitter 115 can convey video content, information, or data of the source signals to downstream devices using various formats or signaling levels, such as with HDMI, MIPI, or DisplayPort. Logic levels, signaling levels, impedances, or voltage levels can be provided according to a particular output mode. Display interface transmitter 115 and display interface receiver 135 each can handle an associated number of communication channels or lanes, such as a video interfaces with multiple high-speed differential pairs. Display interface transmitter 115 and display interface receiver 135 each can support transfer of auxiliary sideband interfaces.

Link 150 can comprise one or more communication links, such as one or more video links comprising wireless or wired links. Link 150 can comprise various logical, physical, or application programming interfaces. Example links can use metal, glass, optical, air, space, or some other material as the transport media. Link 150 can use various video protocols and formats, such as High-Definition Multimedia Interface (HDMI), Video Electronics Standards Association DisplayPort, Mobile Industry Processor Interface (MIPI) Alliance Display Serial Interface (DSI), Digital Visual Interface (DVI), Wireless Display (WiDi), Miracast, Video Graphics Array (VGA) interfaces, wireless display interfaces, or other digital and analog video links including interface types that are transported over other types of links. In some examples, video data can be transported over link 150 using various data protocols, such as Internet Protocol (IP), Ethernet, hybrid fiber-coax (HFC), WiFi (IEEE 802.11), Bluetooth, other wired or wireless data interfaces, or some other communication format, including combinations, improvements, or variations thereof. Link 150 can include direct links or may include intermediate networks, systems, or devices, and can include a logical network link transported over multiple physical links. Link 150 can include routers, switches, bridges, traffic handling nodes, and the like for transporting traffic among endpoints.

Figure 3:
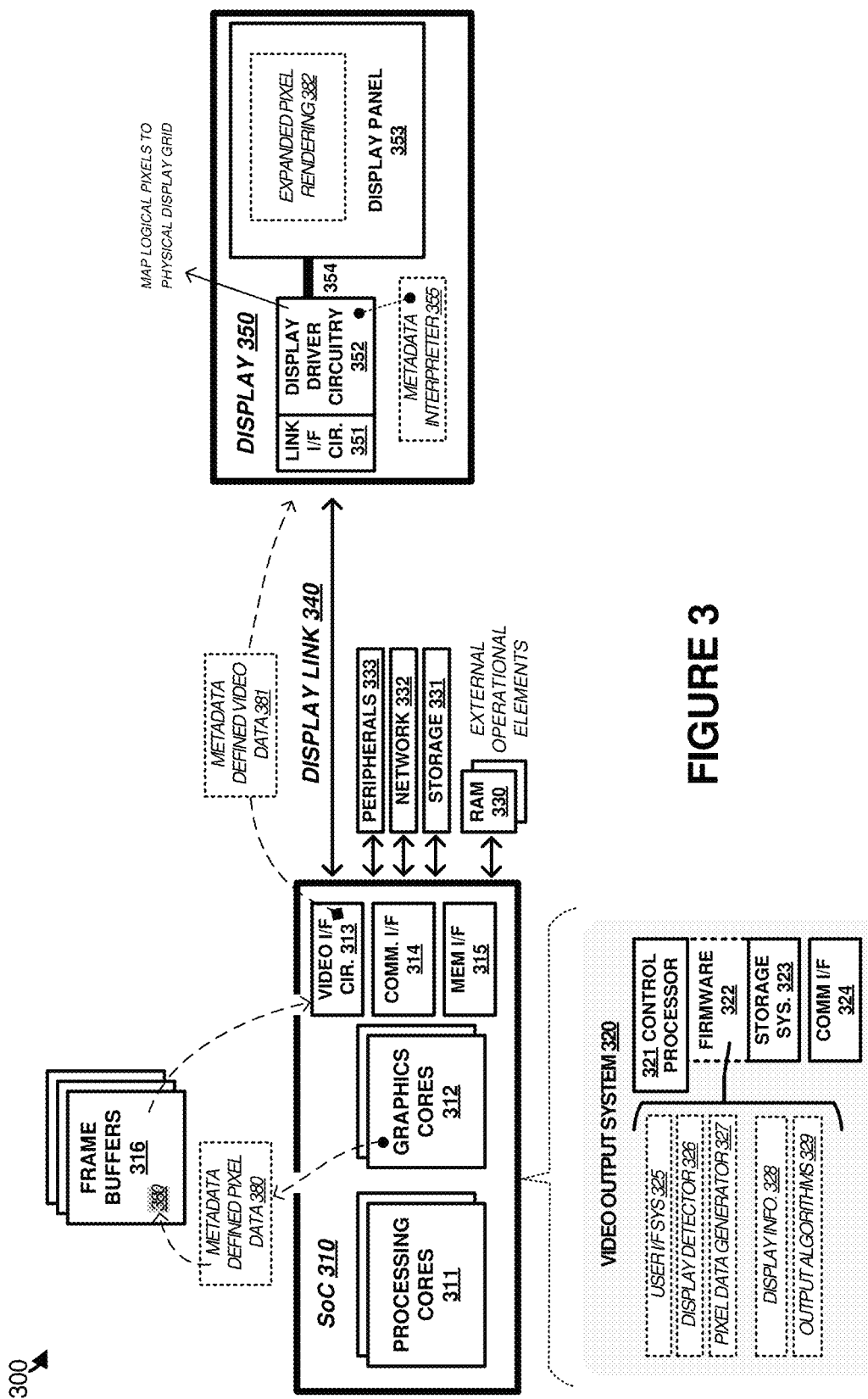
FIG. 3 illustrates a video display environment in an implementation.

As a further example of variable rate pixel techniques and implementations, FIG. 3 is provided. FIG. 3 is a system diagram illustrating variable rate pixel environment 300. Environment 300 includes a system-on-a-chip (SoC) elements, along with other associated elements. Specifically, environment 300 includes SoC 310, video output system 320, external operational elements 330-333 and display 350. SoC 310 further includes internal operational elements 311-315 comprising processing cores 311, graphics cores 312, video interface circuitry 313, communication interfaces 314, and memory interface 315. Video output system 320 includes control processor 321, firmware 322, storage system 323, and communication interface 324. Display 350 includes further internal operational elements 351-355.

Video output system 320 can communicate with any of the elements of FIG. 3, such as SoC 310, external operational elements 330-333, internal operational elements 311-315, and display devices 340-350. External operational elements 330-333 can communicate with SoC 310 over associated communication interfaces, and can receive power from associated power subsystems. SoC 310 and associated internal operational elements 311-315 can communicate internally over associated busses and communication interfaces, and can receive power over associated power links.

Taking the example where elements of environment 300 comprise a user system, such as a gaming system or virtual/augmented reality system (which might include having a virtual/augmented reality headset), a user can couple the example user system to a selected display device. This selected display device can include any associated physical monitors, televisions, projectors, or might include virtualized or networked display systems. Display devices can couple through associated links to video interface circuitry 313 of SoC 310, which can include associated connectors, cabling, interface electronics, and other circuitry.

Each display can have a different associated display technology, such as in liquid crystal (LCD) displays, organic light-emitting diode (OLED) displays, or MEMS, among others. This display technology of the display can also correspond to a number of pixels that are present in the display for displaying graphics/video. For example, a connected display might have a native resolution of 4096×2160 pixels (referred to as '4K') or even higher. This large quantity of pixels (greater than 8 megapixels) must typically be first rendered in graphics cores 312, then transferred by SoC 310 over display link 340 for receipt by display 350. Link 340 and associated display interface circuitry can experience high data rates which might limit further resolution increases or faster frame rates. Thus, a variable rate pixel process can be employed to transfer a larger quantity of data for display at a lower relative bandwidth over a display link/interface. The variable rate pixel process can also provide for more stable signal integrity over longer links, as the associated data rates can be lower than non-variable rate pixel processes.

Turning now to the operation of environment 300, graphics cores 312 can generate/render video data responsive to operation of SoC 310, such as user interaction with user interface elements, media content playback, augmented/virtual reality operations, and other activities. This video data, comprised of a plurality of timewise organized video frames, can be stored in frame buffers 316 for later output to a display device. However, in this example, graphics cores 312 can produce metadata-defined pixel data 380 that comprise the frames. Metadata-defined pixel data 380 includes variable sized 'logical' pixels defined by metadata. In this manner, less space is consumed within frame buffers 316 for individual frames of video, as graphics cores 312 can store logical pixels which each represent a variable quantity of output pixels. Various regions can be defined within each frame that correspond to different output/target resolutions, and logical pixels can be defined on a per-region basis so that associated metadata can apply across an entire region. Alternatively, the metadata can be generated for each logical pixel, each scanline of a frame, or other configurations.

In other examples, graphics cores 312 might generate full-resolution frames comprised of source pixels for storage in frame buffers 316, and further elements can determine a variable-rate pixel representation of the frames upon readout of frame buffers 316. Pixel data generator 327 of video output system 320 might be employed in this regard, and operations of graphics cores 312 might be included into pixel data generator 327 and video output system 320. Pixel data generator 327 can perform color conversion, filtering, and general resizing. Pixel data generator 327 can generate logical pixels based on source pixel data of video frames. These logical pixels can each represent more than one pixel of the video frames, and can be sized according to horizontal sizes (within a scanline) or vertical sizes (spanning more than one scanline). Typically, the logical pixels are determined by analyzing pixel content of a frame that is rendered (or to be rendered) and finding adjacent source pixels that comprise similar or same color compositions. These adjacent source pixels can be combined into or represented by a logical pixel which is sized according to the quantity of adjacent source pixels that share the same/similar color composition. Size limits for each logical pixel can be established, such as to create maximum sizes for logical pixels up to a predetermined number of horizontal source pixels or vertical source pixels. When generated during readout from frame buffers 316, this logical pixel data and associated metadata can be transferred through video interface circuitry 313 and over link 340 to display 350. When generated during rendering and storage into frame buffers 316, this logical pixel data and associated metadata can be stored into frame buffers 316 for later transfer through video interface circuitry 313 and over link 340 to display 350. Since the logical pixels typically represent one or more source pixels, frame buffers 316 can store additional pixel data or be sized smaller in accordance with the reduction in pixel rate relative to source frames that do not incorporate variable-sized pixels. Moreover, bandwidth requirements for video interface circuitry 313, display link 340, and elements of display 350 can be reduced by using the variable-sized pixels discussed herein.

Video output system 320 includes various firmware which directs operation of processing elements of SoC 310 to operate as discussed herein. For example, user interface system 325 can produce various user interface elements for display to a user and receive user interactions via control devices. Display detector 326 can detect properties of an attached display or display device, which might be used to further refine how logical pixels and associated metadata are produced. For example, display detector 326 can determine a display technology and report this display technology to pixel data generator 327 which can alter logical pixel sizing and region configurations based on this display technology. These properties can be requested, read, or otherwise provided by display 350 to display detector 326, such as over display link 340. These properties can include display make/model information, display type information, display descriptors, display identifiers, supported display resolutions, status information, display settings, color gamut information, or other information, including combinations thereof. Foveated displays and MEMS displays might prompt different logical pixel arrangements and metadata than fixed grid displays. These display properties can be stored for later use in display information 328, which can be held in one or more non-transitory computer-readable media. Various output algorithms 329 can also be stored for use by pixel data generator 327. For example, algorithms can be selected among for generating variable rate pixel data based on the display properties, properties of the video being output, user interactions, application types, display link types, or other considerations. These algorithms can correspond to various logical pixel generation techniques, such as sizing and arrangement of logical pixels that comprise video frames. Moreover, these algorithms can correspond to different techniques for generating and transferring metadata. For example, metadata might be transferred with each scanline read out of frame buffers 316, might instead be transferred in bulk with each frame, or might be interleaved with each logical pixel. Other output algorithms can be selected among using the factors discussed above.

As mentioned above, the variable-rate pixel data and associated metadata can be transferred over display link 340 for receipt by display 350. As seen in FIG. 3, metadata-defined video data 381 is transferred over link 340. This data 381 can be transferred using the protocols and physical interfacing appropriate to the display link technology for transferring video data. Moreover, the metadata accompanies the pixel data in video content communication portions of the display link. This metadata can be transferred as if it was video content, and interpreted at a destination to comprise metadata for pixel data instead of actual video content. Thus, a first portion of scanlines transferred over display link 340 might comprise metadata, while a second portion of scanlines transferred might comprise logically-defined pixels. Metadata can be interspersed with pixel data, or might be segregated into time-wise portions. Regardless of the segregation technique, the metadata is transferred as video data over display link 340. A predetermined process to extract the metadata from the pixel data can be established by SoC 310 in conjunction with display 350, so that display 350 can interpret first portions of the video content transferred over display link 340 as metadata and second portions as pixel data. In further examples, a specialized display link is included which might have dedicated 'lanes' or physical signaling for the metadata in addition to pixel data.

Once received by transceiver circuitry of link interface circuitry 351, display driver circuitry 352 of display 350 can interpret the metadata to produce output pixels or output signaling for driving display panel 353 according to a technology of display panel 353. These output pixels might comprise expanded pixel rendering 382 which is comprised of information of each logical pixel that is spread out or mapped to one or more output pixels in accordance with sizing information contained in the metadata. Display driver circuitry 352 provides the output pixels or output pixel signaling over signal lines 354 which drives pixels to be displayed by display panel 353. For example, when display panel 353 comprises a gridded display, such as an LCD or LED screen, display driver circuitry 352 maps logical pixels to a physical display grid of the screen. The logical pixels might be presented over display link 340 in order, and thus an image can be displayed on panel 353 scanline-by-scanline that is expanded from logical pixel scanlines. When logical pixels span more than one scanline, then buffer or memory elements can be included in display driver circuitry 352 to buffer the more than one scanline before expanding logical pixels among the scanlines into output pixels.

In one implementation, display driver system 360 can implement functions of display driver circuitry 352. Display driver system 360 comprises control processor 361 and firmware 362 stored on a non-transitory computer-readable medium, such as similar elements discussed herein for storage system 323. Firmware 362 can include metadata interpreter 361 configured to interpret metadata information transferred with logical pixel data to map the logical pixels to output pixels for display.

Figure 4:
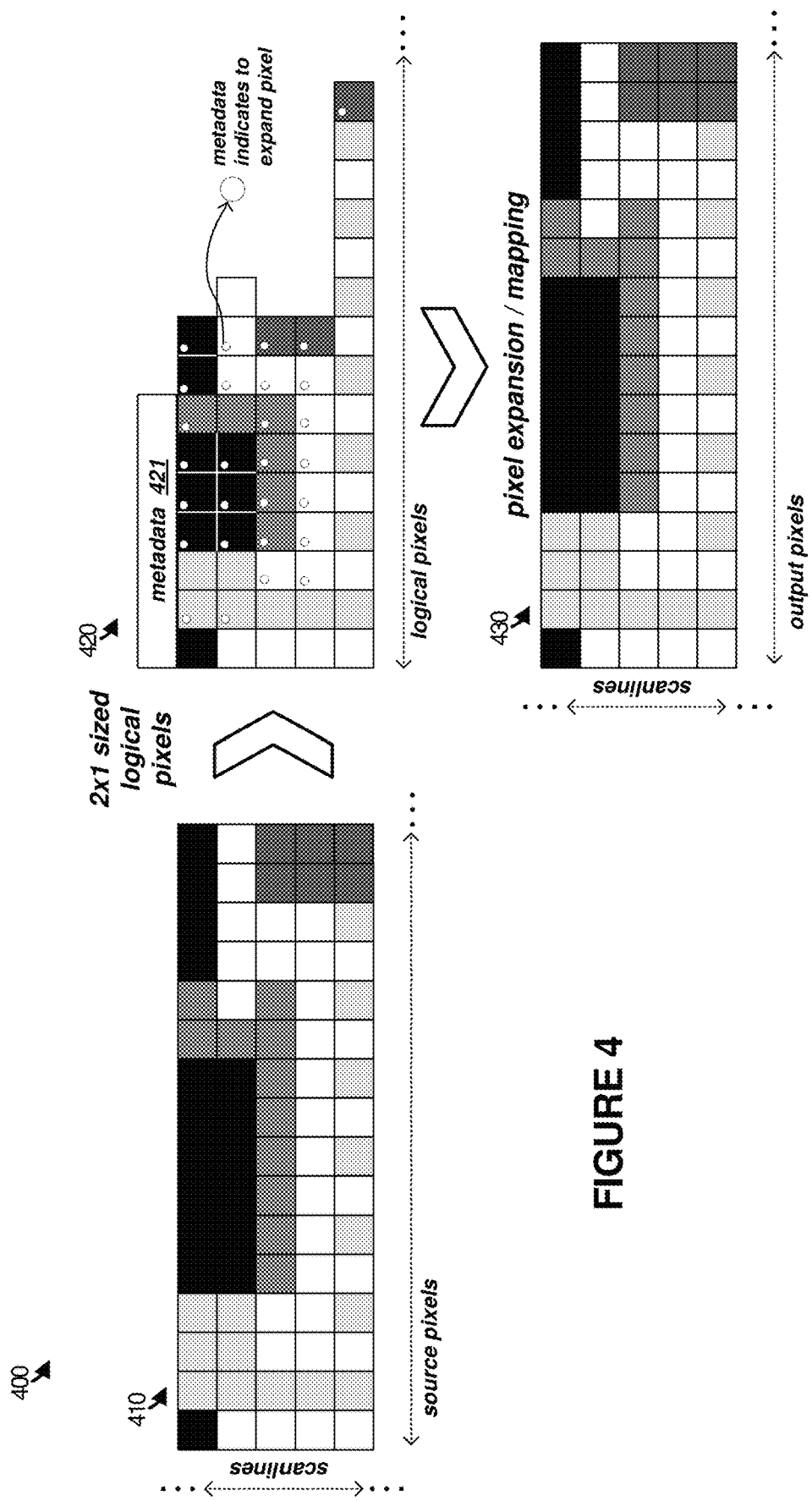
FIG. 4 illustrates example metadata-defined variable pixel data in an implementation.

FIG. 4 is presented as one example 400 of determining logical pixel data and associated metadata. In FIG. 4, source pixels 410 are shown as a portion of a video frame, which might be stored in frame buffers 316 during or after rendering by graphics cores 312. Pixel data generator 327 analyzes the source pixels according to a desired logical pixel sizing. In this example, the logical pixel sizing is 2×1, which indicates a maximum of 2 horizontal pixels and 1 vertical pixel will be represented by each logical pixel. This also indicates that logical pixels will not span scanlines in this particular example. As each scanline is processed, regions of source pixels where two identical colors are found can be represented by one corresponding logical pixel. Thus, after processing source pixels 410, logical pixels 420 can be established. Various logical pixels 420 will represent more than one source pixel, and thus will have metadata generated by pixel data generator 327 to indicate this condition. In FIG. 4, white dots indicate which logical pixels represent 2×1 source pixels, and a lack of white dots indicate which logical pixels represent 1×1 source pixels. In this manner, the number of pixels stored and transferred by SoC 310 can be greatly reduced. This reduction might vary depending on the actual video content of each frame. Although greyscale pixels are indicted in FIG. 4, it should be understood that this is merely representative. Colored pixels might instead be employed using similar techniques.

Metadata 421 is generated which indicates which logical pixels are to be expanded into 2 output pixels of the same color. Metadata 421 can comprise coordinates among a pixel array that indicate logical pixels that represent more than one source pixel. Metadata 421 might be included for each scanline, or might be included for each frame, among other combinations.

Thus, the example in FIG. 4 illustrates one example of determining logical pixels with variable sizing that each represent one or more source pixels comprising at least a portion of a video frame. Metadata is produced that describes the variable sizing for the logical pixels. SoC 310 then transfers the metadata with data representing the logical pixels over display interface circuitry 340 for display. Display responsively maps the logical pixels across target pixels of the display device according to the metadata. The metadata indicates to display 350 to interpret the data representing the logical pixels, and determine one or more output pixels 430 for each of the logical pixels. The display can expand a first quantity of pixels represented by the logical pixels into a second quantity of pixels comprising output pixels 430 for display on the display device. The metadata can also indicate horizontal sizes among ones of the logical pixels that span more than one target pixel of the display device within a scanline. Associated metadata for the logical pixels indicates to display 350 to at least map each of the logical pixels over corresponding target pixels, which might include variations in pixel density according to a particular display technology.

In addition to horizontally varying size of logical pixels, a vertical sizing can be varied. Although not shown in FIG. 4 for clarity, 2×2 or larger logical pixels might be employed. These 2×2 pixels can represent up to two horizontally adjacent source pixels within a scanline, and up to two vertically adjacent source pixels spanning two scanlines. Processing of more than one scanline at a time might be employed by pixel data generator 327 to accommodate logical pixel determinations that span scanlines. Receipt of logical pixels that span scanlines by display 350 might prompt display 350 to buffer more than one scanline as appropriate to determine output pixels for those scanlines. Although latency can be incurrent by buffering more than one scanline before display, the bandwidth savings of interfaces and links using logical pixels that span more than one scanline can be extremely beneficial. In such examples, the metadata indicates vertical sizes among ones of the logical pixels that span more than one display line of the display device. Associated metadata for each of the logical pixels indicates to the display device to buffer a portion of the logical pixels representing the more than one display line, and map the ones of the logical pixels across corresponding target pixels that comprise the more than one display line.

FIG. 5 is presented as another example 500 of determining logical pixel data and associated metadata. In FIG. 5, various regions of different logical pixel sizes and positioning are included in metadata defined pixel data 510. Expanded pixels 520 indicate logical pixels that have been mapped for display on a display panel according to the metadata that accompanies the logical pixels and transferred over a display interface. A relative size among pixel data 510 and expanded pixels 520 illustrates a potential bandwidth savings for associated frame buffers, display interface circuitry, display links, and display-side buffers.

Metadata defined pixel data 510 can be established to support various types of display technologies, such as foveated displays or MEMS displays with variable pixel resolutions or densities. In foveated displays, a particular area or region of a display might have a higher resolution or higher pixel density to support an area of focus by the eyes. Peripheral regions can be of a lower resolution or lower pixel density due to the organic operation of the eyes with regard to visual acuity. Thus, in pixel data 510, a high detail region 511 is established with a first higher relative resolution and that has a pixel rate/size of 2:1 (up to two source pixels represented by one logical pixel). A low detail region 512 can be established with a second lower relative resolution and with a 4:1 pixel sizing (up to four source pixels represented by one logical pixel). Various regions of interest can also be established with associated resolutions and logical pixel sizing. Positioning of the various regions can correspond directly to positioning found within pixel data 510, or might be defined explicitly in metadata 516. Thus, metadata 516 can describe not only logical pixel sizing among the logical pixel data, but can further describe regions within target pixels of a display into which groupings of ones of the logical pixels are to be positioned for display Pixel data 510, which includes metadata 516 in this example, can be transferred over a display link for subsequent display. Prior to display, however, the logical pixels must be expanded or mapped into target pixels which drive an associated display panel or other display element. For example, if the display comprises a panel with a grid, then target pixels can be represented by expanded pixels 520. Expanded pixels 520 have a pixel height and width that corresponds to a display panel, with associated internal pixel densities/resolutions. As mentioned above, expanded pixels are determined from pixel data 510 and the associated metadata 516 to expand logical pixels that represent more than one pixel and position/size specialized regions. Thus, in FIG. 5, high detail region 511 is positioned into a center of expanded pixels 520, while other regions 512-515 are positioned and sized accordingly.

Returning to a discussion of the elements of FIG. 3, video output system 320 illustrates a control system that is representative of any system or collection of systems in which the various operational architectures, scenarios, and processes disclosed herein may be implemented. For example, video output system 320 can be used to implement any of the control elements of FIG. 1, such as variable pixel rate service 111.

Video output system 320 can be implemented by various elements that include, but are not limited to, graphics processing subsystems, graphics controllers, graphics cards, or graphics cores of computers, gaming systems, virtual reality devices, augmented reality devices, smartphones, laptop computers, tablet computers, desktop computers, server computers, hybrid computers, rack servers, web servers, cloud computing platforms, and data center equipment, as well as any other type of physical or virtual machine, and other computing systems and devices, as well as any variation or combination thereof. Video output system 320 may be implemented as a single apparatus, system, or device or may be implemented in a distributed manner as multiple apparatuses, systems, or devices. Video output system 320 includes, but is not limited to, control processor 321, firmware 322, storage system 323, and communication interface 324. Control processor 321 is operatively coupled with storage system 323 and communication interface system 324.

Control processor 321 loads and executes firmware 322 from storage system 323. Firmware 322 includes user interface system 325, display detector 326, pixel data generator 327, display information 328, and output algorithms 329 which are representative of the processes, services, and platforms discussed with respect to the preceding Figures. Display information 328 and output algorithms 329 comprise data structures that hold various data and algorithms associated with operations of firmware 322.

When executed by control processor 321 to provide enhanced variable-rate pixel output services, among other services, firmware 322 directs control processor 321 to operate as described herein for at least the various processes, operational scenarios, and sequences discussed in the foregoing implementations. Video output system 320 may optionally include additional devices, features, or functionality not discussed for purposes of brevity.

Referring still to FIG. 3, control processor 321 may comprise a micro-processor and processing circuitry that retrieves and executes firmware 322 from storage system 323. Control processor 321 may be implemented within a single processing device, but may also be distributed across multiple processing devices or sub-systems that cooperate in executing program instructions. Examples of control processor 321 include general purpose central processing units, application specific processors, and logic devices, as well as any other type of processing device, combinations, or variations thereof.

Storage system 323 may comprise any computer readable storage media readable by control processor 321 and capable of storing firmware 322. Storage system 323 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 323 may also include computer readable communication media over which at least some of firmware 322 may be communicated internally or externally. Storage system 323 may be implemented as a single storage device, but may also be implemented across multiple storage devices or sub-systems co-located or distributed relative to each other. Storage system 323 may comprise additional elements, such as a controller, capable of communicating with control processor 321 or possibly other systems.

Firmware 322 may be implemented in program instructions and among other functions may, when executed by control processor 321, direct control processor 321 to operate as described with respect to the various operational scenarios, sequences, and processes illustrated herein. For example, firmware 322 may include program instructions for implementing enhanced variable-rate pixel output services, among other services.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Firmware 322 may include additional processes, programs, or components, such as operating system software or other application software, in addition to or that including user interface system 325, display detector 326, pixel data generator 327, display information 328, and output algorithms 329. Firmware 322 may also comprise firmware or some other form of machine-readable processing instructions executable by control processor 321.

In general, firmware 322 may, when loaded into control processor 321 and executed, transform a suitable apparatus, system, or device (of which video output system 320 is representative) overall from a general-purpose computing system into a special-purpose computing system customized to provide enhanced variable-rate pixel output services, among other services. Indeed, encoding firmware 322 on storage system 323 may transform the physical structure of storage system 323. The specific transformation of the physical structure may depend on various factors in different implementations of this description. Examples of such factors may include, but are not limited to, the technology used to implement the storage media of storage system 323 and whether the computer-storage media are characterized as primary or secondary storage, as well as other factors.

For example, if the computer readable storage media are implemented as semiconductor-based memory, firmware 322 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

User interface system 325 provides for user input and output related to configuring the output operations of SoC 310. User interface system 325 can receive input and provide output over a programming interface, and can be carried over communication interface 324. User interface system 325 can comprise an application programming interface (API), or other programing interfaces. However, it should be understood that other user interface systems can be provided, such as for control of SoC 310, or applications, games, or platforms executed by SoC 310. In network examples, a user interface system might include web interfaces and terminal interfaces. A user interface system can packetize display or graphics data for remote display by a display system or computing system coupled over one or more network interfaces or web interfaces. Physical or logical elements of user interface systems can provide alerts or visual outputs to users or other operators. User interface systems may also include associated user interface software executable by control processor 321 in support of the various user input and output operations discussed above. Separately or in conjunction with each other and other hardware and software elements, the user interface software and user interface devices may support a graphical user interface, a natural user interface, or any other type of user interface. In further examples, user interface systems may interface with an operator via a gaming controller, touchscreen, keyboard, mouse, voice input device, audio input device, or other touch input device for receiving input from a user. Output devices such as a display, speakers, web interfaces, terminal interfaces, and other types of output devices may also be interfaced by a user interface system.

Communication interface 324 may include communication connections and devices that allow for communication with various operational elements, user interfaces, SoC devices, display interfaces, display devices, or communication networks. Examples of connections and devices that together allow for inter-system communication may include system management interfaces, network interfaces, network interface cards, communication busses, antennas, RF circuitry, transceivers, and other communication circuitry. The connections and devices may communicate over communication media to exchange communications with other computing systems or networks of systems, such as metal, glass, air, or any other suitable communication media.

Communication between video output system 320 and other computing systems, such as display devices, operator systems, or end user terminals, may occur over a video or display interfaces, which can be transported over any communication network or networks and in accordance with various communication protocols, combinations of protocols, or variations thereof. Example display interfaces include High-Definition Multimedia Interface (HDMI), Mobile Industry Processor Interface (MIPI) Alliance Display Serial Interface (DSI), Video Electronics Standards Association DisplayPort, Digital Visual Interface (DVI), Wireless Display (WiDi), Miracast, Video Graphics Array (VGA) interfaces, wireless display interfaces, or other digital or analog video links. Example networks include intranets, internets, the Internet, local area networks, wide area networks, wireless networks, wired networks, virtual networks, software defined networks, data center buses, computing backplanes, or any other type of network, combination of network, or variation thereof. Some communication protocols that may be used include, but are not limited to, the Internet protocol (IP, IPv4, IPv6, etc.), the transmission control protocol (TCP), and the user datagram protocol (UDP), as well as any other suitable communication protocol, variation, or combination thereof.

Certain inventive aspects may be appreciated from the foregoing disclosure, of which the following are various examples.

Example 1

A method of providing video data for display on a display device, the method comprising determining logical pixels with variable sizing that each represent one or more source pixels comprising at least a portion of a video frame, producing metadata describing the variable sizing for the logical pixels, and transferring the metadata with data representing the logical pixels over a display interface for display of at least the portion of the video frame on the display device that maps the logical pixels across target pixels of the display device.

Example 2

The method of Example 1, where the variable sizing comprises a horizontal quantity of the source pixels and a vertical quantity of the source pixels represented by each of the logical pixels.

Example 3

The method of Examples 1-2, where the variable sizing further comprises each of the logical pixels spanning at least two display lines of the video frame.

Example 4

The method of Examples 1-3, where the metadata further describes regions within the target pixels of the display device into which groupings of ones of the logical pixels are to be positioned for display.

Example 5

The method of Examples 1-4, where transferring the metadata with the data representing the logical pixels over the display interface comprises transferring both the metadata and the data representing the logical pixels as video data over the display interface.

Example 6

The method of Examples 1-5, where the metadata indicates to the display device to interpret the data representing the logical pixels and determine one or more integer or fractional output pixels for each of the logical pixels that expand a first quantity of pixels represented by the logical pixels into a second quantity of pixels comprising the target pixels for display on the display device.

Example 7

The method of Examples 1-6, where the metadata indicates horizontal sizes among ones of the logical pixels that span more than one integer or fractional target pixel of the display device; and where associated metadata for the ones of the logical pixels indicates to the display device to at least map each of the ones of the logical pixels over corresponding target pixels.

Example 8

The method of Examples 1-7, where the metadata indicates vertical sizes among ones of the logical pixels that span more than one display line of the display device; and where associated metadata for the ones of logical pixels indicates to the display device to buffer a portion of the logical pixels representing the more than one display line, and map the ones of the logical pixels across corresponding target pixels that comprise the more than one display line.

Example 9

The method of Examples 1-8, further comprising receiving display properties from the display device over the display interface that indicate one or more among a target resolution and a display technology type, and determining at least the variable sizing based in part on the display properties.

Example 10

A display device, comprising a display interface configured to receive video data comprising variable pixels described by metadata, where each of the variable pixels can be configured to represent one or more source pixels for at least a portion of an associated video frame. The display device also includes a display driver configured to interpret the metadata for the variable pixels to map the variable pixels across target pixels of an associated display, and drive the target pixels for display by the associated display.

Example 11

The display device of Example 10, where the metadata describes sizing among the variable pixels comprising a horizontal quantity of the source pixels and a vertical quantity of the source pixels represented by each of the variable pixels.

Example 12

The display device of Examples 10-11, where the sizing further comprises each of the variable pixels spanning at least two display lines of the video frame.

Example 13

The display device of Examples 10-12, where the metadata describes regions within the target pixels into which groupings of ones of the variable pixels are to be positioned for display.

Example 14

The display device of Examples 10-13, where the video data further comprises the metadata, and comprising the display driver configured to distinguish a portion of the video data corresponding to the variable pixels from a second portion of the video data corresponding to the metadata.

Example 15

The display device of Examples 10-14, comprising the display driver configured to interpret a portion of the video data representing the variable pixels with at least the metadata to determine one or more integer or fractional output pixels for each of the variable pixels that expand a first quantity of pixels represented by the variable pixels into a second quantity of pixels comprising the target pixels for display.

Example 16

The display device of Examples 10-15, comprising based at least on the metadata indicating horizontal sizes among ones of the variable pixels that span more than one integer or fractional target pixel of the associated display, the display driver configured to map each of the ones of the variable pixels over corresponding target pixels.

Example 17

The display device of Examples 10-16, comprising based at least on the metadata indicating vertical sizes among ones of the variable pixels that span more than one display line of the associated display, the display driver configured to buffer a portion of the variable pixels representing the more than one display line, and map the ones of the variable pixels across corresponding target pixels that comprise the more than one display line.

Example 18

The display device of Examples 10-17, comprising the display interface configured to provide display properties that indicate one or more among a target resolution and a display technology type, and where the variable pixels and the metadata are determined by a video source based in part on the display properties.

Example 19

A video output apparatus for a user device, comprising one or more non-transitory computer readable storage media, a processing system operatively coupled with the one or more non-transitory computer readable storage media, and a variable pixel rate service comprising program instructions stored on the one or more non-transitory computer readable storage media. Based on being read and executed by the processing system, the program instructions direct the processing system to at least determine output pixels with variable sizing that each span one or more source pixels comprising at least a portion of a video frame, produce metadata describing the variable sizing for the output pixels, and transfer video data comprising the metadata and the output pixels for displaying at least the portion of the video frame on a display device that interprets the metadata to map the output pixels across display pixels of the display device.

Example 20

The apparatus of Example 19, where the metadata indicates to the display device to interpret the video data to determine more than one display pixel for each of the output pixels by at least expanding a first quantity of pixels represented by the output pixels into a second quantity of pixels comprising the display pixels.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

It should be noted that the term 'video' and 'graphics' are employed herein, and these can refer to moving and non-moving images, multimedia, graphics, graphical user interfaces, gaming interfaces, productivity interfaces, or other graphical elements for display to a user. Moreover, the video or graphics are typically rendered in a digital format for display on a digital display. However, the techniques and processes discussed herein are not limited to digital video and graphics, and instead can apply to other displays and graphical data converted from a digital format into a display format.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the subject matter of this application. Those skilled in the art will also appreciate that the features described above can be combined in various ways to form multiple implementations. As a result, the invention is not limited to the specific implementations described above, but only by the claims and their equivalents.

What is claimed is:

1. A method comprising:
   in a display device, receiving a video frame over a display link representing source pixels, wherein the video frame comprises logical pixels that each represent more than one source pixel according to a selected sizing, additional pixels that each correspond to one source pixel, and metadata specific to the video frame that indicates the selected sizing for the logical pixels and indicators of which pixels included in the video frame comprise the logical pixels and the additional pixels; and
   interpreting the metadata for the video frame to determine portions of the video frame corresponding to the logical pixels and the additional pixels, and map each of the logical pixels across more than one output pixel according to the selected sizing and the indicators included in the metadata.

2. The method of claim 1, further comprising:
   storing the video frame comprising the logical pixels and the metadata in a frame buffer associated with a graphics processor.

3. The method of claim 1, wherein the metadata is included in a header or footer portion of the video frame.

4. The method of claim 1, wherein the metadata is included in one or more scanlines of at least a portion of the video frame.

5. The method of claim 1, wherein the metadata accompanies the video frame over a transfer pathway for the video frame.

6. The method of claim 1, wherein the selected sizing comprises at least one among a height and width indicating a quantity of the source pixels represented by corresponding ones of the logical pixels.

7. The method of claim 1, wherein the metadata further describes regions within the video frame for sets the logical pixels having similar sizing.

8. The method of claim 1, wherein the selected sizing indicates to determine integer or fractional output pixels from each of the logical pixels that expand a first quantity of pixels represented by the logical pixels into a second quantity of pixels larger than the first quantity.

9. The method of claim 1, further comprising:
   generating output pixels based at least on expanding the logical pixels according to the selected sizing and the indicators included in the metadata.

10. An interface system of a display device, comprising:
a receiver configured to receive, over a display link coupled to the display device, a video frame representing source pixels, wherein the video frame comprises logical pixels that each represent more than one source pixel according to a selected sizing, additional pixels that each correspond to one source pixel, and metadata specific to the video frame that indicates the selected sizing for the logical pixels and indicators of which pixels included in the video frame comprise the logical pixels and the additional pixels; and
a storage element configured to store the video frame with the metadata for interpretation of the metadata to determine portions of the video frame corresponding to the logical pixels and the additional pixels, and map each of the logical pixels across more than one output pixel according to the selected sizing and the indicators included in the metadata.

11. The interface system of claim 10, comprising:
the storage element configured to store the video frame comprising the logical pixels and the metadata in a frame buffer associated with a graphics processor.

12. The interface system of claim 10, wherein the metadata is included in a header or footer portion of the video frame.

13. The interface system of claim 10, wherein the metadata is included in one or more scanlines of at least a portion of the video frame.

14. The interface system of claim 10, wherein the metadata accompanies the video frame over a transfer pathway for the video frame.

15. The interface system of claim 10, wherein the selected sizing comprises at least one among a height and width indicating a quantity of the source pixels represented by corresponding ones of the logical pixels.

16. The interface system of claim 10, wherein the metadata further describes regions within the video frame for sets the logical pixels having similar sizing.

17. The interface system of claim 10, wherein the selected sizing indicates to determine integer or fractional output pixels from each of the logical pixels that expand a first quantity of pixels represented by the logical pixels into a second quantity of pixels larger than the first quantity.

18. The interface system of claim 10, further comprising:
a display driver configured to generate output pixels based at least on expanding the logical pixels according to the selected sizing and the indicators included in the metadata.

19. An apparatus, comprising:
one or more non-transitory computer readable storage media;
a processing system operatively coupled with the one or more non-transitory computer readable storage media; and
program instructions stored on the one or more non-transitory computer readable storage media that, based on being read and executed by the processing system, direct the processing system to at least:
over a display link of a display device, receive a video frame representing source pixels, wherein the video frame comprises logical pixels that each represent more than one source pixel according to a selected sizing, additional pixels that each correspond to one source pixel, and metadata specific to the video frame that indicates the selected sizing for the logical pixels and indicators of which pixels included in the video frame comprise the logical pixels and the additional pixels; and
interpret the metadata for the video frame to determine portions of the video frame corresponding to the logical pixels and the additional pixels, and map each of the logical pixels across more than one output pixel according to the selected sizing and the indicators included in the metadata.

20. The apparatus of claim 19, wherein the selected sizing indicates to determine integer or fractional output pixels from each of the logical pixels that expand a first quantity of pixels represented by the logical pixels into a second quantity of pixels larger than the first quantity.

* * * * *